US012565594B2

(12) United States Patent
Jung et al.

(10) Patent No.: US 12,565,594 B2
(45) Date of Patent: Mar. 3, 2026

(54) HOUSING INCLUDING BIOMATERIAL AND ELECTRONIC DEVICE INCLUDING THE SAME

(71) Applicants:Samsung Electronics Co., Ltd., Suwon-si (KR); NOROO Paint & Coatings Co., Ltd., Anyang-si (KR)

(72) Inventors: Hyunjung Jung, Suwon-si (KR); Hangyu Hwang, Suwon-si (KR); Kisun Lee, Anyang-si (KR); Wonki Lee, Anyang-si (KR); Sungjun Jang, Anyang-si (KR); Byounggi Cho, Anyang-si (KR); Hyeonseok Yoon, Suwon-si (KR); Hyoin Kim, Suwon-si (KR)

(73) Assignees: Samsung Electronics Co., Ltd., Suwon-si (KR); Noroo Paint & Coatings Co., Ltd., Anyang-si (KR)

( * ) Notice: Subject to any disclaimer, the term of this patent is extended or adjusted under 35 U.S.C. 154(b) by 408 days.

(21) Appl. No.: 18/186,513

(22) Filed: Mar. 20, 2023

(65) Prior Publication Data

US 2023/0416555 A1    Dec. 28, 2023

Related U.S. Application Data

(63) Continuation of application No. PCT/KR2023/003421, filed on Mar. 14, 2023.

(30) Foreign Application Priority Data

Jun. 24, 2022    (KR) ........................ 10-2022-0077868
Jul. 29, 2022    (KR) ........................ 10-2022-0095084

(51) Int. Cl.
C09D 133/14    (2006.01)
C09D 133/04    (2006.01)
C09D 175/04    (2006.01)

(52) U.S. Cl.
CPC ......... C09D 133/14 (2013.01); C09D 175/04 (2013.01)

(58) Field of Classification Search
None
See application file for complete search history.

(56) References Cited

U.S. PATENT DOCUMENTS

| | | | |
|---|---|---|---|
| 7,169,475 B2 | 1/2007 | Sormani et al. | |
| 11,254,782 B2 | 2/2022 | Seo et al. | |
| 2010/0014232 A1* | 1/2010 | Nishimura | ........ B29C 45/14073 |
| | | | 65/102 |
| 2014/0227513 A1 | 8/2014 | Kiuchi | |
| 2020/0062976 A1 | 2/2020 | Harada et al. | |
| 2023/0081057 A1 | 3/2023 | Janakiraman et al. | |

FOREIGN PATENT DOCUMENTS

| | | | |
|---|---|---|---|
| EP | 3 556 818 A1 | 10/2019 | |
| EP | 2 809 690 B1 | 4/2020 | |
| JP | 2006-520841 A | 9/2006 | |
| JP | 5983621 B2 | 9/2016 | |
| JP | 2020-179553 A | 11/2020 | |
| KR | 10-2015-0139209 A | 12/2015 | |
| KR | 10-1619590 B1 | 5/2016 | |
| KR | 10-1638794 B1 | 7/2016 | |
| KR | 10-2016-0136502 A | 11/2016 | |
| KR | 10-1994185 B1 | 7/2019 | |
| KR | 10-2171805 B1 | 10/2020 | |
| KR | 10-2021-0108735 A | 11/2021 | |
| KR | 10-2023-0032856 A | 3/2023 | |

OTHER PUBLICATIONS

International Search Report with Written Opinion and English translation dated Jun. 20, 2023; International Appln. No. PCT/KR2023/003421.

* cited by examiner

*Primary Examiner* — Sheeba Ahmed
(74) *Attorney, Agent, or Firm* — Jefferson IP Law, LLP

(57) ABSTRACT

A housing of an electronic device including polymer materials is provided. The housing includes a polymer substrate, a primer layer disposed on at least a portion of the polymer substrate, a color layer disposed on the primer layer, and a coating layer disposed on the color layer. The primer layer, the color layer, and the coating layer include a biomass polyurethane resin and have a glass transition temperature of 80° C. to 110° C.

18 Claims, 5 Drawing Sheets

100

200

A

A'

HOUSING INCLUDING BIOMATERIAL AND ELECTRONIC DEVICE INCLUDING THE SAME

CROSS-REFERENCE TO RELATED APPLICATION(S)

This application is a continuation application, claiming priority under § 365(c), of an International Application No. PCT/KR2023/003421, filed on Mar. 14, 2023, which is based on and claims the benefit of a Korean patent application number filed on Jun. 24, 2022, in the Korean Intellectual Property Office, and of a Korean patent application number 10-2022-0095084, filed on Jul. 29, 2022, in the Korean Intellectual Property Office, the disclosure of each of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd., and 2) NOROO Paint & Coatings Co., Ltd.

BACKGROUND

1. Field

The disclosure relates to a housing including a biomaterial and an electronic device including the same.

2. Description of Related Art

Polyurethane is a high molecular compound including a urethane (—NHCOO—) bond generated by polymerization of polyol and isocyanate. Polyurethane is commonly used as a material for various products such as electronic devices, automobiles, packaging materials, furniture, clothing and so on.

Polyurethane is highly dependent on petroleum because polyol and isocyanate derived from petroleum are used as its raw materials. Recently, the development of biomass polyurethane manufacturing technology using various biomaterials, which are ecofriendly and sustainable materials, is in progress.

The above information is presented as background information only to assist with an understanding of the disclosure. No determination has been made, and no assertion is made, as to whether any of the above might be applicable as prior art with regard to the disclosure.

SUMMARY

Polyurethane resin forms a three-dimensional network structure between molecules, and thus, it is commonly used as a coating material owing to its excellent coating properties and workability. For example, a housing made of a polymer material may include a coating layer coated with a polyurethane resin coating material. In a case in which a polyurethane resin derived from petroleum is replaced with biomass polyurethane, which is one of eco-friendly materials, the drying speed after coating may be slow due to the biomass polyurethane having a long carbon chain. If the drying time is prolonged, adhesion between the polymer substrate and the coating layer may be degraded, and the durability of the coating layer may deteriorate.

Aspects of the disclosure are to address at least the above-mentioned problems and/or disadvantages and to provide at least the advantages described below.

Additional aspects will be set forth in part in the description which follows and, in part, will be apparent from the description, or may be learned by practice of the presented embodiments.

In accordance with an aspect of the disclosure, a housing is provided. The housing includes a polymer substrate, a primer layer, a color layer, and a coating layer. The housing includes polymer materials. The polymer substrate includes a primer layer. The primer layer may be disposed on at least a portion of the polymer substrate. The color layer may be disposed on the primer layer. The coating layer may be disposed on the color layer. The primer layer, the color layer, and the coating layer may include a biomass polyurethane resin. The primer layer, the color layer, and the coating layer may have a glass transition temperature of 80° C. to 110° C.

In accordance with another aspect of the disclosure, an electronic device is provided. The electronic device includes a housing including polymer materials. According to an embodiment, the housing includes a polymer substrate, a primer layer, and a coating layer. The primer layer may be disposed on at least a portion of the polymer substrate. The coating layer may be disposed over the primer layer. The primer layer and the coating layer may include a biomass polyurethane resin. The primer layer and the coating layer may have a glass transition temperature of 80° C. to 110° C.

The housing according to an embodiment includes a biomaterial, which is one of eco-friendly materials, thereby reducing the amount of greenhouse gas generated in its manufacturing process and facilitating recycling upon disposal. According to an embodiment, the coating layer of the housing can provide improved adhesion and durability with the polymer substrate.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description, taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
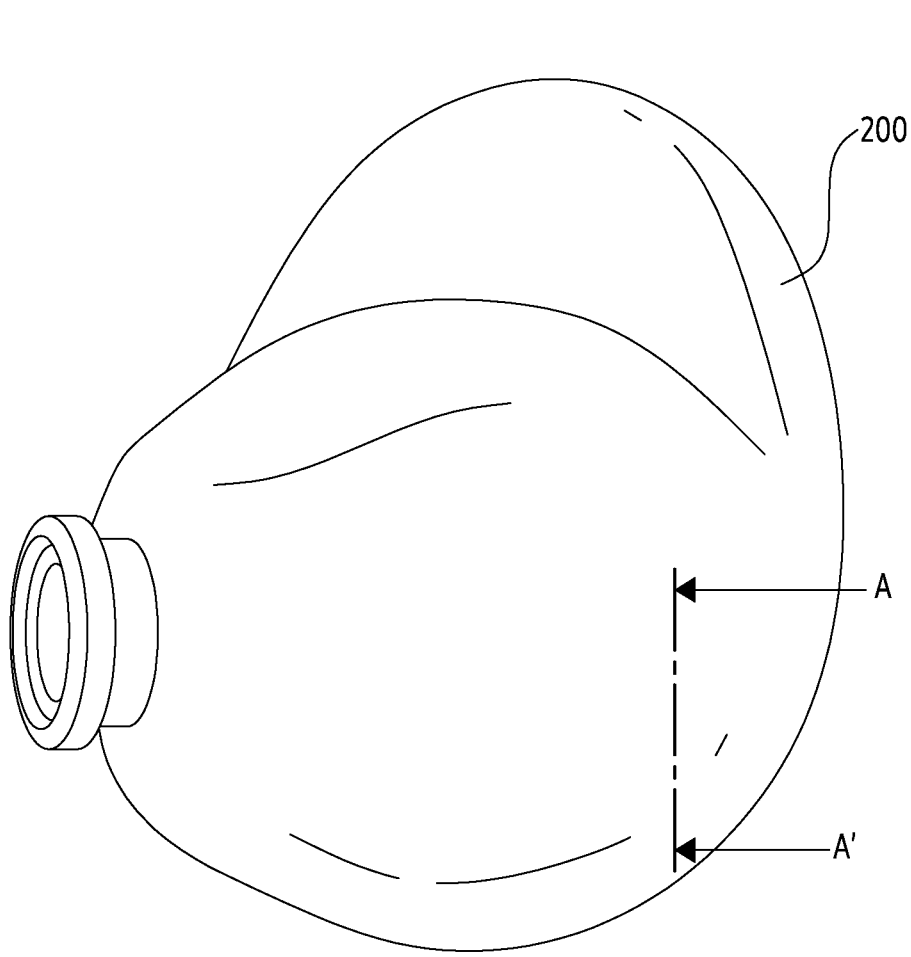
FIGS. 1A and 1B shows an example of an electronic device according to various embodiments of the disclosure.
Figure 1B:
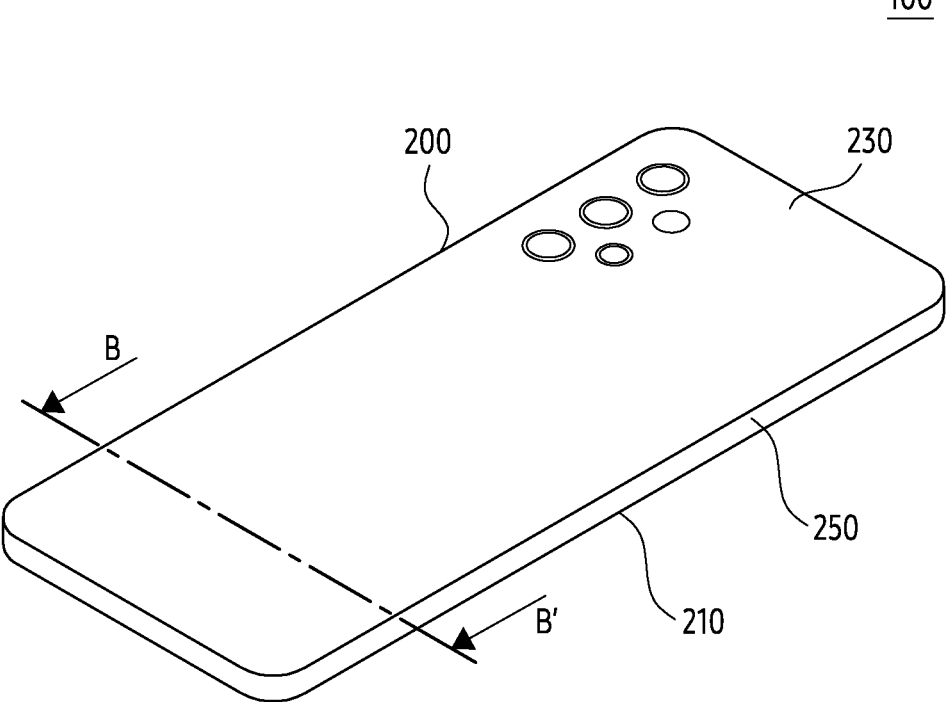

FIGS. 1A and 1B shows an example of an electronic device according to various embodiments of the disclosure.

Referring to FIGS. 1A and 1B, an electronic device 100 according to an embodiment may include a housing 200 forming an external appearance of the electronic device 100. Referring to FIG. 1A, the electronic device 100 may be referred to as a wireless earphone device (e.g., earbuds). The housing 200 may have a shape corresponding to the shape of a human ear so as to be seated on a user's ears. The housing 200 may accommodate various electronic components (e.g., batteries) for operating the wireless earphone therein. Referring to FIG. 1B, the electronic device 100 may be referred to as at least one of a smartphone or a tablet personal computer (PC). For example, the housing 200 may have a front plate 210, a rear plate 230, and a side bezel member 250. The front plate 210, the rear plate 230, and the side bezel member 250 may be coupled to each other to form the housing 200 capable of accommodating various electronic components therein.

According to an embodiment, the housing 200 may be painted with a certain pigment in order to visually provide users with at least one of various colors or patterns. The housing 200 may include a polymer material. For example, the polymer material may include an engineering plastic with high strength and elasticity. The housing 200 may include a coating layer (e.g., a coating layer 202 of FIG. 2) with at least one of a certain color or pattern on a polymer substrate (e.g., a polymer substrate 201 of FIG. 2) forming an appearance of the housing 200. The coating layer 202 may serve to implement a variety of images of the electronic device 100 by providing at least one of various colors or patterns to the housing 200. The coating layer 202 can protect the housing 200 from any external impacts. The coating layer 202 may be formed by drying a pigment coated on the polymer substrate 201. The coating layer 202 may be formed on a surface of the housing 200 facing the outside. According to an embodiment, the coating layer 202 may include a plurality of layers.

In FIGS. 1A and 1B, the electronic device 100 has been described as a wireless earphone or a smartphone, but the disclosure is not limited thereto. For example, the electronic device 100 may be an electronic device including a housing with an injection molding material. For example, the electronic device 100 may include at least one of, e.g., an augmented reality (AR) device, a virtual reality (VR) device, a portable communication device (e.g., a smartphone), a computing device, a portable multimedia device, a portable medical device, a camera, a wearable device, or a home appliance, all of which may include at least one coating layer on an injection molded material forming the appearance.

Figure 2:
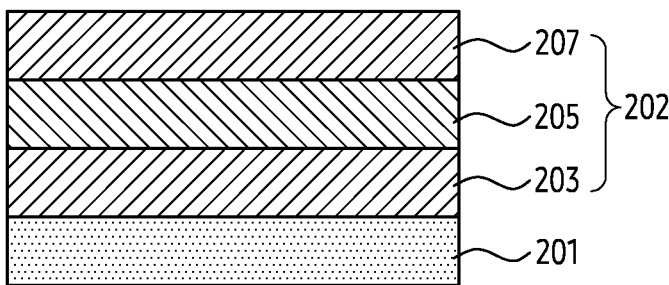
FIG. 2 is a cross-sectional view of a housing taken along a line A-A' in FIG. 1A or a line B-B' in FIG. 1B, according to an embodiment of the disclosure.

FIG. 2 is a cross-sectional view of a housing taken along a line A-A' in FIG. 1A or a line B-B' in FIG. 1B, according to an embodiment of the disclosure.

Referring to FIG. 2, the housing 200 according to an embodiment may include a polymer substrate 201, a primer layer 203 disposed on at least a portion of an outer surface of the polymer substrate 201, a color layer 205 disposed on the primer layer 203, and a coating layer 207 disposed on the color layer 205. For example, the primer layer 203 may be disposed between the polymer substrate 201 and the coating layer 207. As another example, the color layer 205 may be disposed between the coating layer 207 and the primer layer 203.

According to an embodiment, the primer layer 203, the color layer 205, and the coating layer 207 may form a coating layer 202. For example, the primer layer 203, the color layer 205, and the coating layer 207 may be sequentially stacked on the polymer substrate 201 forming the appearance of the electronic device 100. According to an embodiment, the color layer 205 may be omitted. For example, by means of omission of the color layer 205, the color of the polymer substrate 201 can be used as the external color of the electronic device 100. For example, the primer layer 203 and the coating layer 207 may be sequentially stacked on the polymer substrate 201 forming external appearance of the electronic device 100. For another example, the coating layer 207 may be stacked on the polymer substrate 201 forming the external appearance of the electronic device 100 with the primer layer 203 and the color layer 205 being omitted.

According to an embodiment, the primer layer 203, the color layer 205, and the coating layer 207 may include a biomass polyurethane resin. The biomass is a resource that uses plants or microorganisms as an energy source, and may refer to biological resources that have not undergone a geological formation or fossilization process. Biomass polyurethane may refer to polyurethane manufactured using materials derived from biomass. For example, the biomass polyurethane may be manufactured from at least one of biopolyol or bioisocyanate using biomass resources.

According to an embodiment, the primer layer 203 may be disposed on at least a portion of the polymer substrate 201. The primer layer 203 can provide adhesion between the coating layer 202 and the polymer substrate 201. The color layer 205 may include a relatively large amount of pigment to represent at least one of a certain color or pattern. When the color layer 205 is disposed on the polymer substrate 201, the color layer 205 may detach from the polymer substrate 201 as its adhesion to the polymer substrate 201 decreases over time. For example, the primer layer 203 may be disposed between the polymer substrate 201 and the color layer 205 to improve its adhesion between the polymer substrate 201 and the color layer 205. For example, the primer layer 203 may be disposed between the polymer substrate 201 and the coating layer 207 to improve its adhesion between the polymer substrate 201 and the coating layer 207.

According to an embodiment, the primer layer 203 may be formed by including 5 to 30% by weight of biomass polyurethane resin, 30 to 60% by weight of acrylic resin, 5 to 15% by weight of cellulose acetate butylate, 1 to 2% by weight of a pigment, and 25 to 45% by weight of a mixed solvent. The biomass polyurethane resin included in the primer layer 203 may be compatible with an acrylic resin and have high wetting properties.

According to an embodiment, a weight average molecular weight of the acrylic resin included in the primer layer 203 may be 10,000 to 150,000 g/mol.

According to an embodiment, the color layer 205 may be disposed on the primer layer 203. The color layer 205 can implement a certain color of the coating layer 202. For example, the color layer 205 may contain a greater content of pigment than at least one of the primer layer 203 or the coating layer 207.

According to an embodiment, the color layer 205 may be formed by including at least one of 5 to 30% by weight of biomass polyurethane resin, 30 to 60% by weight of acrylic resin, 5 to 15% by weight of cellulose acetate butylate, 1 to 2% by weight of a pigment, or 25 to 45% by weight of a mixed solvent.

According to an embodiment, the biomass polyurethane resin contained in the primer layer 203 and the color layer 205 may include at least one of 35 to 70% by weight of a bio multi-functional polyol compound, 5 to 15% by weight of acrylic polyol, or 15 to 25% by weight of diisocyanate. According to an embodiment, a weight average molecular weight of the biomass polyurethane resin may be 10,000 to 40,000 g/mol. According to an embodiment, a hydroxyl value of the biomass polyurethane resin may be 30 to 90 mgKOH/g.

According to an embodiment, the diisocyanate may include two or more average functional groups. For example, the diisocyanates may include, for example, at least one of aliphatic isocyanates such as hexamethylene diisocyanate (HDI), trimethylhexamethylene diisocyanate, or lysine diisocyanate; alicyclic diisocyanates such as cyclohexane 1,4-diisocyanate, isophorone diisocyanate (IPDI), dicyclohexylmethane diisocyanate (H12MDI), norbornene diisocyanate (NDI), hydrogenated xylylene diisocyanate, or hydrogenated bis(isocyanatephenyl)methane; aromatic aliphatic polyisocyanates such as 1,2 (or 1,3 or 1,4)-xylylene diisocyanate (XDI) or tetramethylxylylene diisocyanate; or aromatic isocyanates such as phenylene diisocyanate, 2,4 (or 2,6)-toluene diisocyanate (TDI), 3,5-diethyl-2,4-diisocyanate toluene, naphthalene diisocyanate, diphenylmethane-2, 4'(or 4,4')-diisocyanate (MDI), bis(isocyanatephenyl)methane, toluidine diisocyanate, or 1,3-bis(isocyanatephenyl) propane. According to an embodiment, the diisocyanate may include at least one of aliphatic isocyanate (e.g., hexamethylene diisocyanate), isophorone diisocyanate, or alicyclic isocyanate (e.g., dicyclohexylmethane diisocyanate).

According to an embodiment, the acrylic resin included in the color layer 205 may have a weight average molecular weight of 10,000 to 150,000 g/mol. For example, a weight average molecular weight of the acrylic resin may be 50,000 to 130,000 g/mol. When a weight average molecular weight of the acrylic resin is less than 50,000 g/mol, it may be more or less difficult to implement a stable color with a pigment. When a weight average molecular weight of the acrylic resin is greater than 130,000 g/mol, its smoothness may be deteriorated.

According to an embodiment, a weight average molecular weight of the cellulose acetate butylate included in the primer layer 203 and the color layer 205 may be 20,000 to 40,000 g/mol. A hydroxyl group content of the cellulose acetate butylate may be 0.1 to 0.3% by weight.

According to an embodiment, a mixed solvent included in the primer layer 203 and the color layer 205 may include at least one of an ester-based compound or a ketone-based compound. For example, the mixed solvent may include at least one of butyl acetate or ethyl acetate, which are ester-based compounds. For example, the mixed solvent may include methyl ethyl ketone and/or methyl isobutyl ketone, which are ketone-based compounds. However, the disclosure is not limited thereto. The mixed solvent may be a solvent for spraying a composition of the primer layer 203 and the color layer 205.

According to an embodiment, the mixed solvent may be a solvent having a relatively low boiling point. When a coating material containing biomass and a solvent having a relatively high boiling point are used, the drying speed after coating of at least one of the primer layer 203 or the color layer 205 may be slow. For example, in a case in which the coating material containing biomass and methyl isobutyl ketone (boiling point: 115 to 118° C.) are used as solvents, the volatilization rate of the solvent is slow, so the drying speed after coating of at least one of the primer layer 203 or the color layer 205 may be slow. When the drying speed is slow, its durability is weakened, so that the color implementation may be difficult. According to an embodiment, the mixed solvent may be a solvent having a relatively low boiling point. For example, the mixed solvent may be methyl ethyl ketone (boiling point: about 79.64° C.), but the disclosure not limited thereto.

According to an embodiment, the acrylic polyol included in the primer layer 203 and the color layer 205 may have a weight average molecular weight of 5,000 to 20,000 g/mol. The hydroxyl group value of the acrylic polyol may be 30 to 100 mgKOH/g. The acrylic polyol may be prepared by polymerizing an acrylic acid ester-based monomer, an unsaturated monomer having a hydroxyl group, an unsaturated monomer having a carboxyl group, an initiator, and a solvent at a temperature of about to 130° C. The acrylic acid ester-based monomer may include at least one of methyl (meth)acrylate, ethyl(meth)acrylate, propyl methacrylate, normal butyl (meth)acrylate, isobutyl (meth)acrylate, tert-butyl (meth)acrylate, 2-ethylhexyl (meth)acrylate, benzyl methacrylate, phenyl methacrylate, stearic acrylate, cyclohexyl methacrylate, or lauryl methacrylate. The acrylic acid ester-based monomer may be used in a range of 10 to 80% by weight for 100% by weight of the total monomer. The unsaturated monomer having a hydroxyl group may include at least one of 2-hydroxy ethyl methacrylate, hydroxypropyl methacrylate, or hydroxy butyl methacrylate. The unsaturated monomer having a hydroxyl group may be used in a range of 10 to 30% by weight for 100% by weight of the total monomer. The unsaturated monomer having a carboxyl group may include at least one of acrylic acid, methacrylic acid, maleic acid, fumaric acid, or itaconic acid. The unsaturated monomer having a carboxyl group may be used in a range of 1 to 4% by weight for 100% by weight of the total monomer. When the content of the unsaturated monomer having a carboxyl group is less than 1% by weight, the material may lack self-crosslinking properties. When the content of the unsaturated monomer having a carboxyl group exceeds 4% by weight, the material may become unstable and have low compatibility.

According to an embodiment, the initiator for preparing the acrylic polyol may be a radical initiator. The radical initiator may include at least of benzoyl peroxide, azobisisobutyronitrile, t-butyl peroxy benzoate, t-butyl peroxy 2-ethylhexanoate, t-butyl peroxy acetate and di-t-butyl peroxide.

According to an embodiment, the coating layer 207 may be disposed on the color layer 205. The coating layer 207 may protect at least one of the color layer 205 the primer layer 203, or the polymer substrate 201 from the outside.

According to an embodiment, the coating layer 207 may be formed by including 1 to 5% by weight of a photoinitiator, 5 to 25% by weight of photocurable bi-functional bio-urethane acrylate oligomer, 15 to 40% by weight of photocurable hex-functional bio-urethane acrylate oligomer, 10 to 30% by weight of monomer, 0.1 to 1% by weight of silicone additive, and 25 to 45% by weight of a mixed solvent.

According to an embodiment, the coating layer 207 may be formed by including 1 to 5% by weight of a photoinitiator, 5 to 15% by weight of photocurable bi-functional bio-urethane acrylate oligomer, 5 to 15% by weight of photocurable hexa-functional bio-urethane acrylate oligomer, 15 to 35% by weight of photocurable multi-functional urethane acrylate oligomer, 10 to 30% by weight of poly-functional monomer, 0.1 to 1% by weight of a silicone additive, and 35 to 55% by weight of a mixed solvent. Since the low-functional oligomer has a linear structure, a material containing the low-functional oligomer may be resistant to ultraviolet rays, have bendability, and be resistant to impact. Since the high-functional oligomer has the network structure, a material containing the high-functional oligomer can have abrasion-resistance, contamination-resistance, and high hardness. According to an embodiment, the coating layer 207 includes both the low-functional oligomer and the high-functional oligomer at a certain weight ratio, thereby providing the physical properties capable of protecting the primer layer 203 and the color layer 205.

The photocurable multi-functional bio-urethane acrylate oligomer may include 30 to 65% by weight of bio-aliphatic diisocyanate or bio-aliphatic polyisocyanate, and 35 to 70% by weight of a mono-functional or multi-functional acrylic acid ester monomer containing a hydroxyl group. The photocurable multi-functional urethane acrylate oligomer may include an acrylate oligomer having 2 to 10 of functional groups. The photocurable multi-functional bio-urethane acrylate oligomer may be prepared by mixing 30 to 65% by weight of bio-aliphatic diisocyanate or bio-aliphatic polyisocyanate, and 35 to 70% by weight of a mono-functional or multi-functional acrylic acid ester monomer containing a hydroxyl group. The photocurable multi-functional bio-urethane acrylate oligomer may have 3 to 9 of unsaturated functional groups and a biomass content of 20 to 50%.

According to an embodiment, the photocurable bi-functional bio-urethane acrylate oligomer included in the coating layer 207 may include 40 to 80% by weight of bio polyol, 15 to 45% by weight of aliphatic or alicyclic diisocyanate, and 5 to 30% by weight of acrylic acid ester monomer containing a hydroxyl group. According to an embodiment, the photocurable bi-functional bio-urethane acrylate oligomer may be prepared by mixing and reacting 40 to 80% by weight of bio polyol, and 15 to 45% by weight of aliphatic or alicyclic diisocyanate, and then further mixing and reacting 5 to 30% by weight of acrylic acid ester monomer containing a hydroxyl group. The bi-functional bio-urethane acrylate oligomer may include a bi-functional unsaturated functional group, 40 to 80% by weight of biomass. A molecular weight of the bio-polyol may be 500 to 5,000 g/mol.

According to an embodiment, the monomer included in the coating layer 207 may include at least one of caprolactone acrylate, benzyl acrylate, tetrahydrofurfuryl acrylate, stearyl acrylate, lauryl acrylate, 1,4-Butanedioldi(meth)

acrylate, neopentylglycoldi(meth)acrylate, hydroxypivalic acid neopentylglycoldi(meth)acrylate, dicyclopentanyldi (meth)acrylate, caprolactone modified dicyclopentenyldi (meth)acrylate, ethylene oxide-modified phosphoric acid di(meth)acrylate, arylated cyclohexyl di(meth)acrylate, ethylene glycol di(meth)acrylate, 1,6-hexadiol diacrylate, trimethylol Propane tri(meth)acrylate, pentaerythritol tri(meth) acrylate, dipentaerythritol penta(meth)acrylate, dipentaerythritol hexa(meth)acrylate, polyol poly(meth) acrylate, di(meth)acrylate of bisphenol A-diglycidyl ether, urethane (meth)acrylate, or glycerin trimethacrylate. However, the disclosure is not limited thereto.

According to an embodiment, the silicone additive included in the color layer 205 may include at least one of polyester-modified polydimethylsiloxane or polyether-modified polydimethylsiloxane.

According to an embodiment, the mixed solvent included in the color layer 205 may include at least one of ethanol, isopropanol, methyl ethyl ketone, methyl isobutyl ketone, xylene, or a toluene-based compound.

According to an embodiment, the primer layer 203, the color layer 205, and the coating layer 207 may include a biomass polyurethane resin without using petroleum-derived polyurethane. According to an embodiment, the housing 200 including a biomaterial can reduce the amount of greenhouse gas generated in its manufacturing process and can be easily recycled upon disposal.

The housing 200 according to an embodiment may manufactured by sequentially stacking the primer layer 203, the color layer 205, and the coating layer 207 onto the polymer substrate 201. Since biomass polyurethane has long carbon chains, it may require a relatively longer time of drying after a coating. When the drying rate of the coating layer 202 is slow, the adhesion between the polymer substrate 201 and the coating layer 202 may decrease, and thus, the durability of the coating layer 202 may deteriorate.

The housing 200 according to an embodiment includes biomass polyurethane, so each of the primer layer 203, the color layer 205, and the coating layer 207 may contain radioactive carbon (C13, C14). When each of the primer layer 203, the color layer 205, and the coating layer 207 is measured according to American Society for Testing and Materials (ASTM) D6866, each of the primer layer 203, the color layer 205, and the coating layer 207 may have 10 to 50% by weight of radioactive carbon (C13, C14) with respect to the total weight.

When a material derived from petroleum is used, a weight average molecular weight of the coating layer 202 may be 140,000 to 160,000 g/mol. According to an embodiment, each of the primer layer 203, the color layer 205, and the coating layer 207 includes biomass polyurethane, which is a biomass-based material, and thus, when the weight average molecular weight is measured by a gel permeation chromatography (GPC) analysis method, a weight average molecular weight of the primer layer 203, the color layer 205, and the coating layer 207 may be 90,000 to 100,000 g/mol. A weight average molecular weight of the biomass polyurethane resin included in the primer layer 203, the color layer 205, and the coating layer 207 may be to 40,000 g/mol.

According to an embodiment, the primer layer 203, the color layer 205, and the coating layer 207 may have a glass transition temperature of about 80° C. to about 110° C. The glass transition temperature may refer to a temperature at which a glass transition occurs from a brittle glassy state to a viscous or rubbery state as the temperature rises. A housing 200 made of a material having a relatively low glass transition temperature may be easily subject to deformation at a relatively low temperature, so it can have weakened durability. To the contrary, a housing 200 made of a material having a relatively high glass transition temperature may have stronger durability because the coating layer 202 cannot be easily softened. In general, since a biomass resin has a glass transition temperature at about 60° C., the biomass resin may be softened relatively easily. Such softening of the biomass resin may cause an increase in its drying time.

According to an embodiment, a glass transition temperature of the acrylic resin included in the primer layer 203 and the color layer 205 may be in a range of about to about 110° C. For example, the acrylic resin may have a glass transition temperature of about 60 to about 100° C. When the glass transition temperature of the acrylic resin is lower than about 50° C., its hot water resistance may decrease. When the glass transition temperature of the acrylic resin is higher than about 110° C., the coating layer 202 may be easily subject to breakage or the durability of the coating layer 202 may deteriorate. The primer layer 203 and the color layer 205 may have a glass transition temperature of about 80° C. or higher by using an acrylic resin.

According to an embodiment, the glass transition temperature of cellulose acetate butylate included in the primer layer 203 and the color layer 205 may be in a range of about 50 to about 110° C.

According to an embodiment, the primer layer 203, the color layer 205, and the coating layer 207 forming the coating layer 202 of the housing 200 may have a glass transition temperature of about 80° C. to about 110° C. in case of having the above-described composition ratio of materials. The primer layer 203, the color layer 205, and the coating layer 207 according to an embodiment are softened at a relatively high temperature of about 80° C. or higher, so it can reduce an increase in drying time and render relatively stronger durability. Since the primer layer 203, the color layer 205, and the coating layer 207 according to an embodiment have a glass transition temperature of about 110° C. or less, it can facilitate formation of the coating layer 202.

Figure 3:
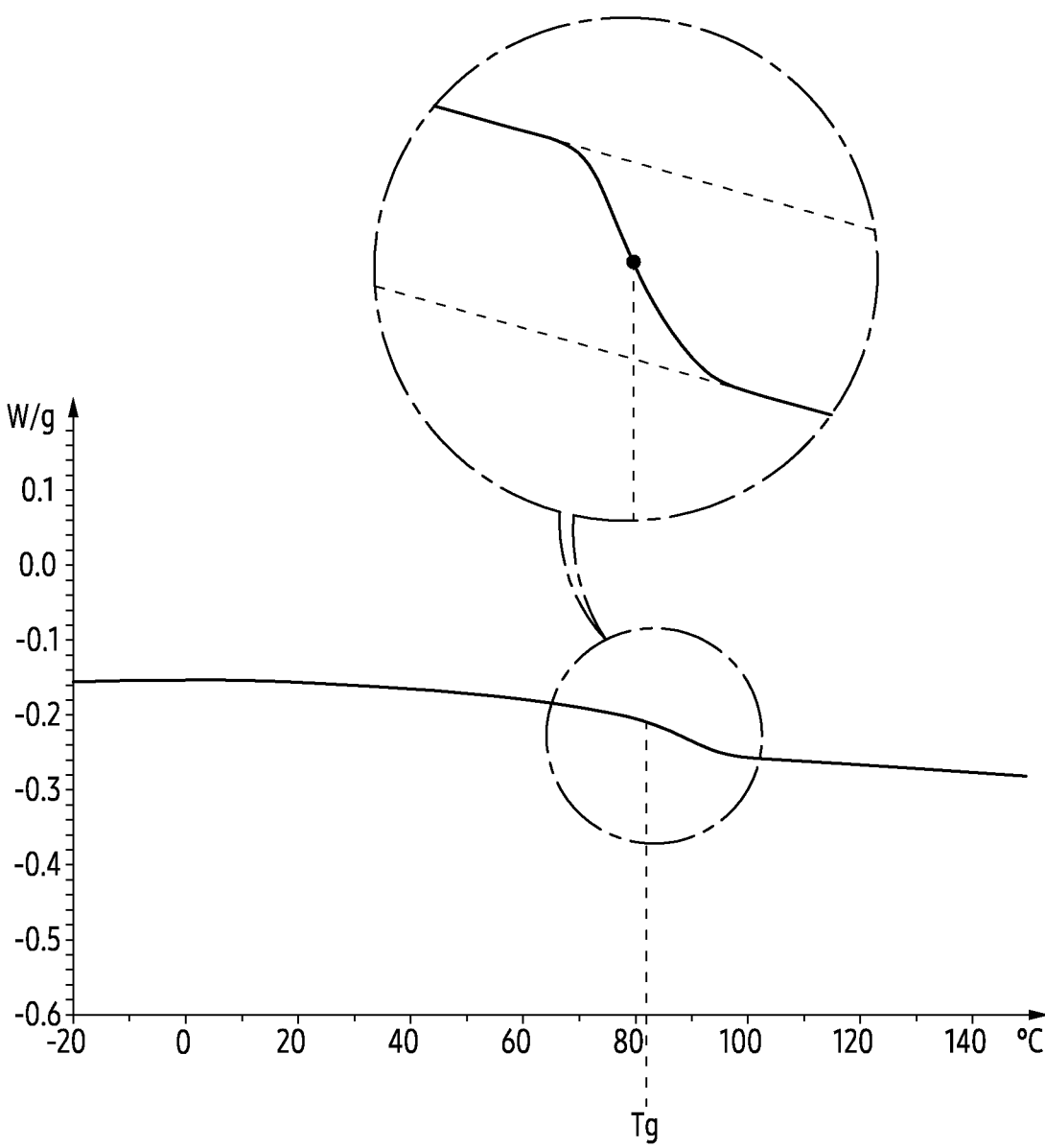
FIG. 3 is a view showing a result of measuring a glass transition temperature of a coating layer of a housing, using a differential scanning calorimeter, according to an embodiment of the disclosure.

FIG. 3 is a view showing a result of measuring a glass transition temperature of a coating layer of a housing by means of a differential scanning calorimeter, according to an embodiment of the disclosure, wherein an x-axis of the graph indicates temperature (unit: ° C.) and a y-axis of the graph indicates heat flow (unit: W/g).

According to an embodiment, the primer layer (e.g., the primer layer 203 of FIG. 2), the color layer (e.g., the color layer 205 of FIG. 2), and the coating layer (e.g., the coating layer 207 of FIG. 2) may have a glass transition temperature of 80° C. to 110° C., respectively. The glass transition temperature can be identified using a differential scanning calorimeter (DSC). The DSC uses an analysis method capable of measuring heat entry into and out of a specimen, and can measure a glass transition temperature through a chemical reaction generated at a specific temperature. The DSC can measure the glass transition temperature through a difference in the amount of heat flowing between a specimen and a reference material while heating or cooling the same. When a glass transition occurs, a transition may occur from a glassy state to a rubbery state. Due to a change in state, a change in heat capacity may result in a baseline change. The glass transition temperature can be measured as a midpoint of the baseline.

Referring to FIG. 3, when a glass transition temperature is measured by the DSC after cutting the housing (e.g., the housing 200 of FIG. 2) according to an embodiment, the glass transition temperature may be about 85° C. The glass transition temperature of the housing including the coating layer derived from petroleum may be about 60° C. In case of the coating layer containing a petroleum-based coating material, it has a relatively low glass transition temperature (e.g., about 60° C.), so the coating layer containing a petroleum-based coating material may take a relatively long time to dry after it has been coated on a polymer substrate (e.g., the polymer substrate 201 of FIG. 2). As the drying time gets relatively longer, the adhesion between the coating layer containing the petroleum-based coating material and the polymer substrate may be relatively lower. The coating layer (e.g., the coating layer 202 of FIG. 2) of the housing 200 according to an embodiment has a glass transition temperature of 80° C. or higher, so that it can be softened at a relatively higher temperature. According to an embodiment, the coating layer 202 of the housing 200 can be dried relatively quickly while including a biomaterial. Since the coating layer 202 according to an embodiment has relatively stronger adhesion to a polymer substrate (e.g., the polymer substrate 201 of FIG. 2), the housing 200 can provide improved durability. Thus, since the housing 200 according to an embodiment includes a biomaterial, the amount of greenhouse gas generated during the manufacturing and disposal process may be reduced.

Hereinafter, the effects of the embodiments of the disclosure will be explained through tests on Examples and Comparative Examples as follows.

Examples 1 and 2: Preparation of Primer Layer 203 According to Examples

A primer layer 203 included a composition of a mixing ratio as shown in Table 1 below. For forming the primer layer 203, the composition was spray-coated on a polymer substrate 201 to a thickness of about 4 to about 6 μm, and then dried at about for about 5 minutes.

TABLE 1

| Composition | Example 1 | Example 2 |
|---|---|---|
| Biomass Polyurethane | 10 | 5 |
| Acrylic Resin | 40 | 45 |
| Cellulose Acetate Butyrate | 10 | 10 |
| Pigment | 1.5 | 1.5 |
| Mixed Solvent | 38.5 | 38.5 |

Comparative Examples 1 and 2: Preparation of Primer Layer According to Comparative Examples A primer layer for comparison with the examples 1 and 2 included a composition having a mixing ratio as shown in Table 2 below. For forming the primer layer, the composition was spray-coated on a polymer substrate to a thickness of about 4 to about 6 μm, and then dried at about 60° C. for about 5 minutes.

TABLE 2

| Composition | Comparative Example 1 | Comparative Example 2 |
|---|---|---|
| Biomass Polyurethane | 0 | 35 |
| Acrylic Resin | 50 | 15 |
| Cellulose Acetate Butyrate | 10 | 10 |
| Pigment | 1.5 | 1.5 |
| Mixed Solvent | 38.5 | 38.5 |

Examples 3 and 4: Preparation of Color Layer 205
According to Examples

A color layer 205 included a composition having a mixing ratio as shown in Table 3 below. For forming the color layer 205, the composition was spray-coated on a dried primer layer 203 to a thickness of about 4 to about 6 μm, and then dried at about 60° C. for about 5 minutes.

TABLE 3

| Composition | Example 3 | Example 4 |
| --- | --- | --- |
| Biomass Polyurethane | 12.5 | 10 |
| Acrylic Resin | 37.5 | 40 |
| Cellulose Acetate Butyrate | 10 | 10 |
| Pigment | 1.5 | 1.5 |
| Mixed Solvent | 38.5 | 38.5 |

Comparative Examples 3 and 4: Preparation of
Color Layer According to Comparative Examples A color layer for comparison with the examples 3 and 4 included a composition having a mixing ratio as shown in Table 4 below. For forming the color layer, the composition was spray-coated on a dried primer layer to a thickness of about 4 to about 6 μm, and then dried at about 60° C. for about 5 minutes.

TABLE 4

| Composition | Comparative Example 3 | Comparative Example 4 |
| --- | --- | --- |
| Biomass Polyurethane | 0 | 35 |
| Acrylic Resin | 50 | 15 |
| Cellulose Acetate Butyrate | 10 | 10 |
| Pigment | 1.5 | 1.5 |
| Mixed Solvent | 38.5 | 38.5 |

Embodiments 5 and 6: Preparation of Coating
Layer 207 According to Examples

A coating layer 207 included a composition having a mixing ratio as shown in Table 5 below. For forming the color layer 205, the composition was spray-coated on the color layer 205 to a thickness of about 22 to about 26 μm, and then dried at about 40° C. for about 2 minutes. After drying, the coating layer 207 was irradiated with an irradiation amount of about 1000mJ/cm² using a light irradiator.

TABLE 5

| Composition | Example 5 | Example 6 |
| --- | --- | --- |
| Photoinitiator | 2 | 2 |
| Bifunctional Bio Urethane Acrylate Oligomer | 20 | 20 |
| Hexagonal Bio Urethane Acrylate Oligomer | 25 | 35 |
| Bifunctional Petroleum Polyurethane Oligomer | 0 | 0 |
| Hexafunctional Petroleum Polyurethane Oligomer | 0 | 0 |
| Monomer | 20 | 10 |
| Silicone Additive | 0.5 | 0.5 |
| Mixed Solvent | 32.5 | 32.5 |

Comparative Examples 5 and 6: Preparation of
Coating Layer According to Comparative Examples A coating layer for comparison with the examples 5 and 6 included a composition having a mixing ratio as shown in Table 6 below. The composition was spray-coated on a color layer to a thickness of about 22 to about 26 μm, and then dried at about 40° C. for about 2 minutes. After drying, the coating layer was irradiated with an irradiation amount of about 1000mJ/cm² using a light irradiator.

TABLE 6

| Composition | Comparative Example 5 | Comparative Example 6 |
| --- | --- | --- |
| Photoinitiator | 2 | 2 |
| Bifunctional Bio Urethane Acrylate Oligomer | 0 | 20 |
| Hexagonal Bio Urethane Acrylate Oligomer | 0 | 35 |
| Bifunctional Petroleum Polyurethane Oligomer | 20 | 0 |
| Hexafunctional Petroleum Polyurethane Oligomer | 25 | 0 |
| Monomer | 20 | 10 |
| Silicone Additive | 0.5 | 0.5 |
| Mixed Solvent | 32.5 | 32.5 |

In order to identify the physical properties of the specimens of Examples 1 to 6 and Comparative Examples 1 to 6, tests were performed in the following manner. The test results are shown in Table 7, Table 8, and Table 9 below.

1. Adhesiveness Test

Gradations were engraved on a coated specimen. The gradations were formed at 1 mm intervals on the specimen. A tape was attached to the specimen surface, and the tape was pulled three times. The test result was determined to be good when there was no peeling on a machined surface at the time of attaching and detaching the tape.

2. Hot-Water Resistance Test

In a constant temperature water bath at a temperature of 80° C.±2° C., for minutes, a coated specimen was precipitated. The specimen was taken out of the constant temperature water bath after 30 minutes and left at a room temperature for 4 hours. Gradations were engraved on a coated specimen. The gradations were formed at 2 mm intervals on the specimen. A tape was attached to the specimen surface, and the tape was pulled once. The test result was determined to be good when there was no peeling on a machined surface at the time of attaching and detaching the tape.

3. Pollution Resistance Test

Lipstick was coated on a specimen using a brush with lipstick. The lipstick-coated specimen was left at a room temperature for 10 minutes and then left in a 50° C./95% chamber for 24 hours. Then, the specimen was left at a room temperature for 10 minutes and then examined. The test result was determined to be good when a value of $\Delta E \leq 3.0$ or less was obtained using a color difference meter.

4. Ultraviolet Resistance Test

An ultraviolet (UV) tester (UV LAMP (SANKYO DENKI), 15W, UV-B, 3-month lifespan) was used. A half of a specimen was covered with black tape and then left for 72 hours at a position spaced away by a distance of 20 cm from a lamp. Then, the specimen was left for 4 hours. The experimental result was determined to be good when a value of $\times E \leq 3.0$ or less was obtained using a color difference meter.

5. Chemical Resistance Test

A specimen was rubbed 500 times with an eraser to which a force of 0.5 kgf is applied, in a state of ethyl alcohol being supplied without drying. When there was no peeling of a coating layer 202, the experimental result was determined to be good.

6. Drop Hammer Test

A hammer of 500 g was dropped onto a specimen from a height of 50 cm from the specimen. The test result was determined to be good when there was no crack in the specimen.

TABLE 7

| Test | Example 1 | Example 2 | Comparative Example 1 | Comparative Example 2 |
|---|---|---|---|---|
| Adhesiveness Test | Good | Good | Good | No Good |
| Hot-Water Resistance Test | Good | Good | Good | No Good |

Referring to Table 7, it was confirmed that Examples 1 and 2 have sufficient adhesiveness and resistance to hot water. Further, it was confirmed that a primer layer 203 according to this embodiment has the physical properties sufficient to be used as the housing 200. Comparative Example 1 had good adhesiveness and hot water resistance, but could not be regarded as an eco-friendly material because it contains no biomass polyurethane. Referring to the test results of Comparative Example 2, it was confirmed that the primer layer having a composition ratio different from those of Examples 1 and 2 had deterioration in adhesiveness and resistance to hot water.

TABLE 8

| Test | Example 3 | Example 4 | Comparative Example 3 | Comparative Example 4 |
|---|---|---|---|---|
| Adhesiveness Test | Good | Good | Good | No Good |
| Hot-Water Resistance Test | Good | Good | Good | No Good |

Referring to Table 8, it was confirmed that Examples 3 and 4 have sufficient adhesiveness and resistance to hot water. Further, it was confirmed that a color layer 205 according to this embodiment has the physical properties sufficient to be used as the housing 200. Comparative Example 3 had good adhesiveness and hot water resistance, but could not be regarded as an eco-friendly material because it contains no biomass polyurethane. Referring to the test results of Comparative Example 4, it was confirmed that the color layer having a composition ratio different from those of Examples 3 and 4 had deterioration in adhesiveness and resistance to hot water.

TABLE 9

| Test | Example 5 | Example 6 | Comparative Example 5 | Comparative Example 6 |
|---|---|---|---|---|
| Pollution Resistance Test | Good | Good | Good | No Good |
| Ultraviolet Resistance Test | Good | Good | Good | No Good |
| Chemical Resistance Test | Good | Good | Good | No Good |
| Drop Hammer Test | Good | Good | Good | No Good |

Referring to Table 9, it can be confirmed that Examples 5 and 6 have sufficient pollution resistance, chemical resistance, ultraviolet ray resistance, and durability. Further, it can be confirmed that a coating layer 207 according to an embodiment has the physical properties sufficient to be used as the housing 200. Comparative Example 5 does not contain any biomass polyurethane, so it cannot be viewed as an eco-friendly material. Referring to the test results of Comparative Example 6, it can be confirmed that the coating layer having a composition ratio different from those of Examples 5 and 6 has reduced pollution resistance, chemical resistance, UV resistance, and durability.

According to the above test results, the housing 200 according to an embodiment can have sufficient physical properties while including a biomaterial. According to an embodiment, the primer layer 203, the color layer 205, and the coating layer 207 constituting the coating layer 202 of the housing 200 are eco-friendly owing to including a biomaterial, and can have high adhesion, heat resistance, pollution resistance, UV resistance, chemical resistance, and prolonged durability. An electronic device (e.g., the electronic device 100 of FIG. 1A) including the housing 200 according to an embodiment can have improved physical properties while being environmentally friendly thanks to inclusion of a biomaterial. For example, when the electronic device 100 is a wireless earphone device, the housing 200 coming into contact with a user's body includes a biomaterial, so it can have biocompatibility.

Figure 4:
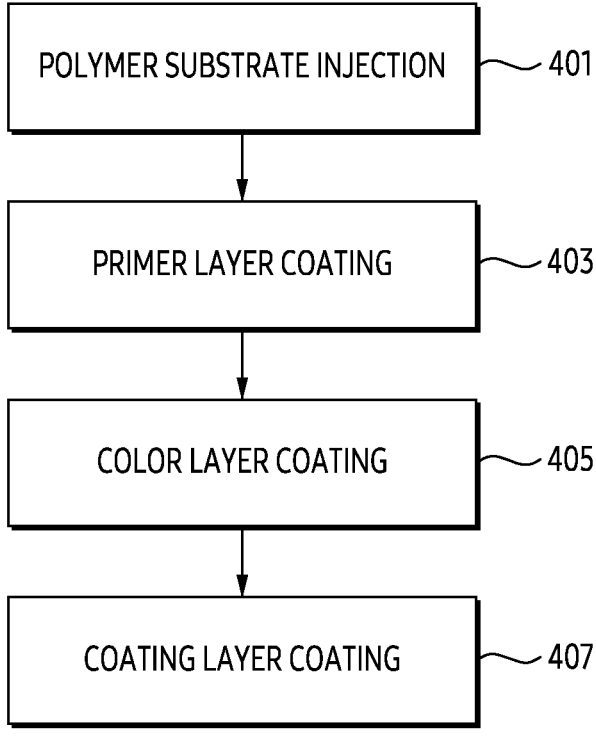
FIG. 4 shows an example of a flowchart of a method for manufacturing a housing according to an embodiment of the disclosure.

FIG. 4 shows an example of a flowchart of a method for manufacturing a housing according to an embodiment of the disclosure.

Referring to FIG. 4, in operation 401, a polymer substrate (e.g., the polymer substrate 201 of FIG. 2) may be injected. The polymer substrate 201 may form the overall appearance of an electronic device (e.g., the electronic device 100 of FIG. 1A). For example, when the electronic device 100 is a wireless earphone device, the polymer substrate 201 may be injected into a shape having an insert formed to be insertable into a user's ear hole and a body seated in the user's ear. Herein, any injection method may be available. For example, the injection method may be of insert injection or double injection. The polymer may be polycarbonate (PC) or acrylonitrile butadiene styrene (PC-ABS), but the disclosure is not limited thereto.

In operation 403, a primer layer (e.g., the primer layer 203 of FIG. 2) may be coated on the polymer substrate 201. According to an embodiment, a composition of the primer layer 203 including biomass polyurethane may be adjusted to a viscosity of about 10.0 to about 15.0 Ford Cup No. 4 (sec) using a diluent. This diluted composition of the primer layer 203 may be coated with a thickness of about 5 μm to about 15 μm on the polymer substrate 201 pretreated using isopropyl alcohol (IPA). The coating may use a spraying method, but the disclosure is not limited thereto. The primer layer 203 may be coated on the polymer substrate 201 by drying at about 60° C. for about minutes after the composition of the primer layer 203 is coated.

In operation 405, a color layer (e.g., the color layer 205 of FIG. 2) may be coated on the primer layer 203. On the primer layer 203 coated in operation 403 may be coated the composition of the color layer 205. The coating may use a spraying method, but the disclosure is not limited thereto. This operation 405 may be omitted. For example, when the polymer substrate 201 has a unique color and the color is then implemented as the color of the housing 200, the operation 405 may be omitted.

In operation 407, a coating layer (e.g., the coating layer 207 of FIG. 2) may be further coated on the color layer 205. If the operation 405 is omitted, in operation 407, the coating layer 207 may be coated on the primer layer 203. According to an embodiment, a composition of the coating layer 207 including photocurable bio-urethane acrylate oligomer may be coated on the color layer 205 or the primer layer 203 with a thickness of about 25 μm to about 35 μm. The coating may use a spraying method, but the disclosure is not limited thereto. After the composition of the coating layer 207 is applied onto the color layer 205 or the primer layer 203, it may be infrared (IR)-dried at about 40° C. for about 1 minute to about 5 minutes. When the IR drying is completed, the coating layer 207 may be photocured by irradiating UV with a light amount of 500 to 1500 mJ/cm2 after a surface adjustment.

According to an embodiment, a housing (e.g., a housing 200 of FIG. 2) may comprise a polymer substrate (e.g., a polymer substrate 201 of FIG. 2), a primer layer (e.g., a primer layer 203 of FIG. 2), a color layer (e.g., a color layer 205 of FIG. 2), and a coating layer (e.g., a coating layer 207 of FIG. 2).

According to an embodiment, the housing may include a polymer material.

According to an embodiment, the primer layer may be disposed on at least a portion of the polymer substrate.

According to an embodiment, the color layer may be disposed on the primer layer.

According to an embodiment, the coating layer may be disposed on the color layer.

According to an embodiment, the primer layer, the color layer, and the coating layer may include a biomass polyurethane resin. The primer layer, the color layer, and the coating layer may have a glass transition temperature of 80° C. to 110° C.

According to an embodiment, the primer layer may include 5% to 30% by weight of the biomass polyurethane resin, 30% to 60% by weight of an acrylic resin, 5% to 15% by weight of cellulose acetate butylate, 1% to 2% by weight of a pigment, and 25% to 45% by weight of a mixed solvent.

According to an embodiment, a weight mean molecular weight of the acrylic resin may be 10,000 g/mol to 150,000 g/mol.

According to an embodiment, a glass transition temperature of the acrylic resin may be 50° C. to 110° C.

According to an embodiment, the color layer may include 5% to 30% by weight of the biomass polyurethane resin, 30% to 60% by weight of acrylic resin, 5% to 15% by weight of cellulose acetate butylate, 1% to 2% by weight of a pigment, and 25% to 45% by weight of a mixed solvent.

According to an embodiment, the coating layer may include 1% to 5% by weight of a photoinitiator, 5% to 25% by weight of photocurable bifunctional bio-urethane acrylate oligomer, 15% to 40% by weight of photocurable hexafunctional bio-urethane acrylate oligomer, 10% to 30% by weight of monomer, 0.1% to 1% by weight of a silicone additive, and 25% to 45% by weight of a mixed solvent.

According to an embodiment, the monomer may include at least one of caprolactone acrylate, benzyl acrylate, tetrahydrofurfuryl acrylate, stearyl acrylate, lauryl acrylate, 1,4-butanedioldi(meth)acrylate, neopentylglycoldi(meth)acrylate, hydroxy roxypivalic acid neopentyl glycol di(meth)acrylate, dicyclopentanyl di(meth)acrylate, caprolactone-modified dicyclopentenyl di(meth)acrylate, ethylene oxide-modified phosphate di(meth)acrylate, arylation cyclohexyl di(meth)acrylate, ethylene glycol di(meth)acrylate, 1,6-hexadiol diacrylate, trimethylolpropane tri(meth)acrylate, pentaerythritol tri(meth)acrylate, dipenta Erythritol penta (meth)acrylate, dipentaerythritol hexa(meth)acrylate, polyol poly(meth)acrylate, di(meth)acrylate of bisphenol A-diglycidyl ether, urethane(meth)acrylate, or glycerin trimethacrylate.

According to an embodiment, the photocurable bifunctional bio-urethane acrylate oligomer may include 40% to 80% by weight of bio polyol, 15% to 45% by weight of aliphatic or alicyclic diisocyanate, and 5% to 30% by weight of acrylic acid ester monomer containing a hydroxyl group.

According to an embodiment, a molecular weight of the biopolyol may be 500 g/mol to 5,000 g/mol.

According to an embodiment, the biomass polyurethane includes 35% to 70% by weight of bio multifunctional polyol compound, 5% to 15% by weight of acrylic polyol, and 15% to 25% by weight of diisocyanate.

According to an embodiment, the diisocyanate may include at least one of hexamethylene diisocyanate, isophorone diisocyanate, or dicyclohexylmethane diisocyanate.

According to an embodiment, a weight mean molecular weight of the acrylic polyol may be 5,000 g/mol to 20,000 g/mol.

According to an embodiment, a weight mean molecular weight of the biomass polyurethane may be 10,000 g/mol to 40,000 g/mol.

According to an embodiment, the primer layer and the color layer may be formed by including a mixed solvent containing at least one of an ester-based compounds or a ketone-based compounds.

According to an embodiment, the coating layer may be formed by including a mixed solvent containing at least one of ethanol, isopropanol, methyl ethyl ketone, methyl isobutyl ketone, xylene, or a toluene-based compound.

According to an embodiment, an electronic device (e.g., an electronic device 100 of FIG. 1A) may comprise a housing (e.g., a housing 200 of FIG. 2) including polymer materials.

According to an embodiment, the housing (e.g., a housing 200 of FIG. 2) may include a polymer substrate (e.g., a polymer substrate 201 of FIG. 2), a primer layer (e.g., a primer layer 203 of FIG. 2), and a coating layer (e.g., a coating layer 207 of FIG. 2).

According to an embodiment, the primer layer may be disposed on at least a portion of the polymer substrate.

According to an embodiment, the coating layer may be disposed over the primer layer.

According to an embodiment, the primer layer and the coating layer may include a biomass polyurethane resin. The primer layer and the coating layer may have a glass transition temperature of 80° C. to 110° C.

According to an embodiment, the housing may further comprise a color layer (e.g., a color layer 205 of FIG. 2). The color layer may be disposed between the primer layer and the coating layer.

According to an embodiment, the color layer may be formed by including 5% to 30% by weight of a biomass polyurethane resin, 30% to 60% by weight of an acrylic resin, 5% to 15% by weight of cellulose acetate butylate, 1% to 2% by weight of a pigment, and 25% to 45% by weight of a mixed solvent.

According to an embodiment, the primer layer may be formed by including 5% to 30% by weight of the biomass polyurethane resin, 30% to 60% by weight of an acrylic resin, 5% to 15% by weight of cellulose acetate butylate, 1% to 2% by weight of a pigment, and 25% to 45% by weight of a mixed solvent.

According to an embodiment, the coating layer may be formed by including 1% to 5% by weight of a photoinitiator, 5% to 25% by weight of photocurable bifunctional bio urethane acrylate oligomer, 15% to 40% by weight of photocurable hexafunctional bio urethane acrylate oligomer, 10% to 30% by weight of monomer, to 1% by weight of a silicone additive, and 25% to 45% by weight of a mixed solvent.

The electronic device according to various embodiments disclosed herein may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A housing of an electronic device including polymer materials, the housing comprising:
   a polymer substrate;
   a primer layer disposed on at least a portion of the polymer substrate;
   a color layer disposed on the primer layer; and
   a coating layer disposed on the color layer,
   wherein the primer layer, the color layer, and the coating layer include biomass-derived polyurethane resin and the primer layer, the color layer, and the coating layer have a glass transition temperature of 80° C. to 110° C.

2. The housing of claim 1, wherein the primer layer includes 5% to 30% by weight of the biomass-derived polyurethane resin, 30% to 60% by weight of an acrylic resin, 5% to 15% by weight of cellulose acetate butylate, 1% to 2% by weight of a pigment, and 25% to 45% by weight of a mixed solvent of ester-based compounds and a ketone-based compounds.

3. The housing of claim 2, wherein a weight mean molecular weight of the acrylic resin is 10,000 g/mol to 150,000 g/mol.

4. The housing of claim 2, wherein a glass transition temperature of the acrylic resin is 50° C. to 110° C.

5. The housing of claim 1, wherein the color layer includes 5% to 30% by weight of the biomass-derived polyurethane resin, 30% to 60% by weight of acrylic resin, 5% to 15% by weight of cellulose acetate butylate, 1% to 2% by weight of a pigment, and 25% to 45% by weight of a mixed solvent of an ester-based compounds and a ketone-based compounds.

6. The housing of claim 1, wherein the coating layer includes 1% to 5% by weight of a photoinitiator, 5% to 25% by weight of photocurable bifunctional bio-urethane acrylate oligomer, 15% to 40% by weight of photocurable hexafunctional bio-urethane acrylate oligomer, 10% to 30% by weight of monomer, 0.1% to 1% by weight of a silicone additive, and 25% to 45% by weight of a mixed solvent, the mixed solvent of ethanol, isopropanol, methyl ethyl ketone, methyl isobutyl ketone, xylene, and/or toluene-based compounds.

7. The housing of claim 6, wherein the monomer includes at least one of caprolactone acrylate, benzyl acrylate, tetrahydrofurfuryl acrylate, stearyl acrylate, lauryl acrylate, 1,4-butanedioldi(meth)acrylate, neopentylglycoldi(meth)acrylate, hydroxy roxypivalic acid neopentyl glycol di(meth)acrylate, dicyclopentanyl di(meth)acrylate, caprolactone-modified dicyclopentenyl di(meth)acrylate, ethylene oxide-modified phosphate di(meth)acrylate, arylation cyclohexyl di(meth)acrylate, ethylene glycol di(meth)acrylate, 1,6-hexadiol diacrylate, trimethylolpropane tri(meth)acrylate, pentaerythritol tri(meth)acrylate, dipenta Erythritol penta (meth)acrylate, dipentaerythritol hexa(meth)acrylate, polyol poly(meth)acrylate, di(meth)acrylate of bisphenol A-diglycidyl ether, urethane(meth)acrylate, or glycerin trimethacrylate.

8. The housing of claim 6, wherein the photocurable bifunctional bio-urethane acrylate oligomer includes 40% to 80% by weight of bio polyol, 15% to 45% by weight of aliphatic or alicyclic diisocyanate, and 5% to 30% by weight of acrylic acid ester monomer containing a hydroxyl group.

9. The housing of claim 8, wherein a molecular weight of the bio polyol is 500 g/mol to 5,000 g/mol.

10. The housing of claim 1, wherein the biomass-derived polyurethane resin includes 35% to 70% by weight of bio multifunctional polyol compound, 5% to 15% by weight of acrylic polyol, and 15% to 25% by weight of diisocyanate.

11. The housing of claim 10, wherein the diisocyanate includes at least one of hexamethylene diisocyanate, isophorone diisocyanate, or dicyclohexylmethane diisocyanate.

12. The housing of claim 10, wherein a weight mean molecular weight of the acrylic polyol is 5,000 g/mol to 20,000 g/mol.

13. The housing of claim 1, wherein a weight mean molecular weight of the biomass-derived polyurethane resin is 10,000 g/mol to 40,000 g/mol.

14. An electronic device comprising:

a housing including polymer materials, wherein the housing includes:

a polymer substrate, a primer layer disposed on at least a portion of the polymer substrate, and a coating layer disposed over the primer layer, and wherein the primer layer and the coating layer include a biomass-derived polyurethane resin and the primer layer and the coating layer have a glass transition temperature of 80° C. to 110° C.

15. The electronic device of claim 14, wherein the housing includes a color layer disposed between the primer layer and the coating layer, the color layer having the glass transition temperature of 80° C. to 110° C.

16. The electronic device of claim 15, wherein the color layer includes 5% to 30% by weight of a biomass-derived polyurethane resin, 30% to 60% by weight of an acrylic resin, 5% to 15% by weight of cellulose acetate butylate, 1% to 2% by weight of a pigment, and 25% to 45% by weight of a mixed solvent of an ester-based compounds or a ketone-based compounds.

17. The electronic device of claim 14, wherein the primer layer includes 5% to 30% by weight of the biomass-derived polyurethane resin, 30% to 60% by weight of an acrylic resin, 5% to 15% by weight of cellulose acetate butylate, 1% to 2% by weight of a pigment, and 25% to 45% by weight of a mixed solvent of an ester-based compounds and a ketone-based compounds.

18. The electronic device of claim 14, wherein the coating layer includes 1% to 5% by weight of a photoinitiator, 5% to 25% by weight of photocurable bifunctional bio urethane acrylate oligomer, 15% to 40% by weight of photocurable hexafunctional bio urethane acrylate oligomer, 10% to 30% by weight of monomer, 0.1% to 1% by weight of a silicone additive, and 25% to 45% by weight of a mixed solvent of ethanol, isopropanol, methyl ethyl ketone, methyl isobutyl ketone, xylene, and/or toluene-based compounds.

* * * * *